(No Model.)
W. A. BARTHOLOMEW.
SAW.
No. 431,316. Patented July 1, 1890.
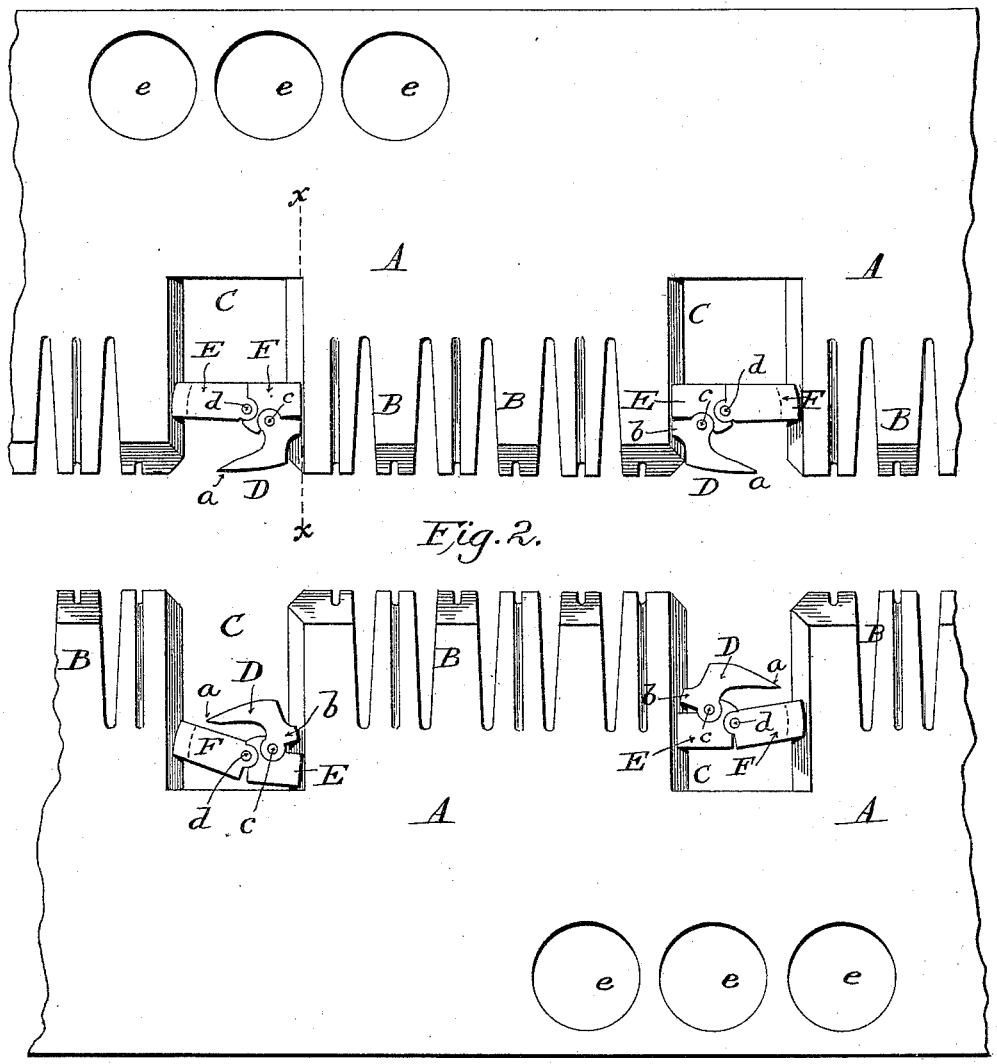
Witnesses:
James F. Duhamel
Horace A. Dodge
Inventor:
W. A. Bartholomew
by Dodge Sons,
Attys.

UNITED STATES PATENT OFFICE.

WILLIAM A. BARTHOLOMEW, OF MARENGO, IOWA.

SAW.

SPECIFICATION forming part of Letters Patent No. 431,316, dated July 1, 1890.

Application filed April 8, 1889. Serial No. 306,414. (No model.)

*To all whom it may concern:*

Be it known that I, WILLIAM A. BARTHOLOMEW, a citizen of the United States, residing at Marengo, in the county of Iowa and State of Iowa, have invented certain new and useful Improvements in Saws, of which the following is a specification.

My invention relates to crosscut-saws; and it consists in a novel construction and arrangement of the clearer thereof, as hereinafter fully set forth and claimed. In saws of this general character the cutting-teeth are arranged in groups and are alternately beveled on opposite faces, which construction leaves a ridge in the bottom of the cut which it is necessary to remove in order to permit the saw to do its work. In order to remove this ridge, saws have been provided with clearer-teeth, which were usually made of a width equal to the thickness of the saw and which were designed to cut away the ridge thus formed, the cutting-edge of the clearer-teeth being at right angles to that of the cutting-teeth proper. Although the cutting-teeth were arranged in groups, it was found practically impossible to sharpen them, except by sharpening one at a time, for the reason that the clearer-teeth, having their cutting-edges extending transversely across the saw, would prevent the reciprocation of a triangular file, such as is commonly used in sharpening saws. It is to overcome this difficulty that the present invention is designed.

In the drawings, Figure 1 is a face view of a part of a saw constructed in accordance with my invention; Fig. 2, a similar view showing the clearer-teeth thrown out of position, so as to permit of the sharpening of the cutting-teeth; Fig. 3, a sectional view on the line $x\,x$ of Fig. 1; Fig. 4, a perspective view of one of the clearer-teeth removed from the saw, and Fig. 5 a sectional view of one of the clearer-teeth on the line $y\,y$ of Fig. 4.

A indicates the saw-blade, provided with the cutting-teeth B, which are arranged in groups and beveled alternately on opposite faces, as is customary in this class of saws.

Between the groups or sets of cutting-teeth the saw-blade is provided with recesses or openings C, which extend into the blade from the cutting-edge thereof and at right angles thereto, the parallel side walls of said recesses being advisedly V-shaped, for a purpose presently explained.

D indicates the clearer-teeth, of which there will be one for each recess or opening, the said clearer-teeth pointing alternately in opposite directions, as shown in Figs. 1 and 2, so as to cut on both strokes of the saw. The tooth D has a broad cutting-point $a$, which, as shown in Fig. 3, is as wide as the thickness of the saw. The tooth D is pivotally secured to a block E by means of a pin or rivet $c$, and the block E is in turn pivotally connected by means of the rivet $d$ with the block F. The outer ends of the blocks E and F are grooved or recessed, as shown in Figs. 3, 4, and 5, to correspond to the side walls of the recesses C, the length of the blocks E and F being such that when they are brought into alignment, as shown in Figs. 1 and 4, they will press upon the walls of the said recesses with sufficient binding force as to prevent accidental movement of the tooth which they carry. The blocks E and F are made of the same thickness as the blade, so as not to project beyond either face thereof.

The tooth D is provided with a grooved heel $b$, which, when the tooth is in its working position, engages with one of the walls of the opening or recess C and prevents any lateral movement of the said tooth, the grooves in the ends of the blocks E and F serving the same purpose with respect to the said blocks.

When it is desired to release the tooth, to change its adjustment or to permit its removal, it is only necessary to throw the outer end of the block F upward, as shown in Fig. 2, when the blocks, with their tooth, may be slid into the inner end of the recess, out of the way of the sharpening-tool. In order to facilitate this movement of the block F, the groove in the outer end thereof will have its inner wall curved or inclined, as indicated by dotted lines in Figs. 1 and 2, the inclination or curvature of the groove facilitating the releasing of the block.

Instead of grooving the ends of the blocks E and F, the said blocks may be provided with tongues to enter grooves in the walls of the recesses C, this construction being merely a reversal of that shown.

The saw-blade will be provided at or near each end with two or more holes or perforations $e$, so as to afford convenient means for grasping hold of the saw to lift it up.

It has before been proposed to make the clearer-teeth removable bodily from the saw-blade; but as I am not aware that it has ever before been proposed to make them "adjustable," in the sense in which that term is used herein, I claim such a saw broadly.

Having thus described my invention, what I claim is—

1. A saw provided with groups of rigid cutting-teeth, formed integral with the saw-blade, and clearer-teeth arranged in recesses in the blade between the groups of cutting-teeth, the said clearer-teeth being adjustably secured within their recesses, substantially as and for the purpose set forth.

2. In combination with the saw-blade A, provided with cutting-teeth B, and with recesses or openings C, extending inward from the cutting-edges of the saw, adjustable clearer-teeth mounted in said openings or recesses, said clearer-teeth being adapted to be moved within the recesses toward and from the edges of the cutting-teeth.

3. In combination with the saw-blade A, provided with cutting-teeth B, and with openings or recesses C, extending inward from the cutting-edge, pivoted blocks E F, and a clearer-tooth D, pivoted to one of said blocks, all substantially as shown.

4. In combination with saw-blade A, provided with cutting-teeth B, and with recesses C, extending inward from the cutting-edge thereof, blocks E and F, pivotally connected with each other, and clearer-tooth D, pivotally connected to block E and provided with a grooved heel $b$, as and for the purpose set forth.

5. In combination with a saw-blade provided with the teeth B, and with the recesses C, blocks E and F, pivotally connected to each other and engaging with the walls of the recesses, and a tooth D, pivotally secured to the block E.

6. In combination with saw-blade A, provided with cutting-teeth B, beveled alternately on opposite edges and arranged in groups, as shown, recesses C, formed in the blade between the groups of cutting-teeth B, and pivoted clearer-teeth D, mounted in said recesses and pointing alternately in opposite directions.

In witness whereof I hereunto set my hand in the presence of two witnesses.

WILLIAM A. BARTHOLOMEW

Witnesses:
J. N. W. RUMPLE,
ANNA L. CONRAD.